W. R. THOMAS.
Car Wheel.
No. 93,769.  Patented Aug. 17, 1869.
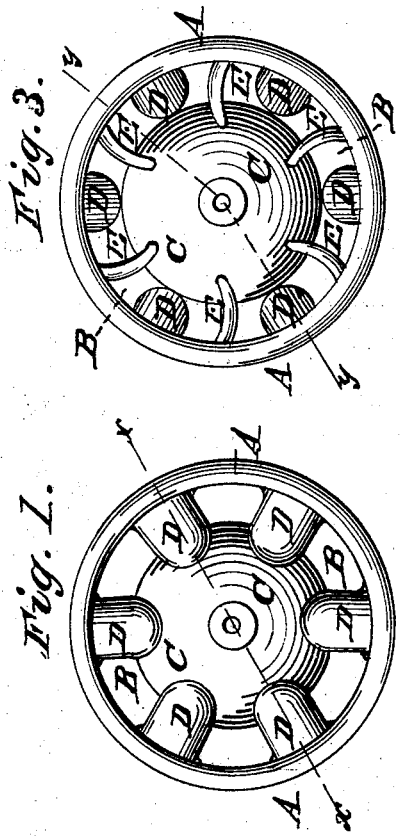
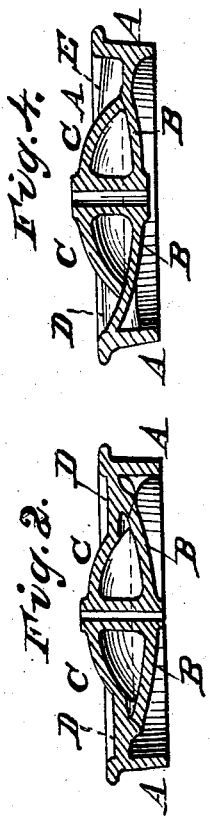
Witnesses:
Inventor:
W. R. Thomas.
per Munn & Co
Attorneys.

United States Patent Office.

W. R. THOMAS, OF CATASAUQUA, PENNSYLVANIA.

Letters Patent No. 93,769, dated August 17, 1869.

IMPROVED CAR-WHEEL.

The Schedule referred to in these Letters Patent and making part of the same.

*To all whom it may concern:*

Be it known that I, W. R. THOMAS, of Catasauqua, Lehigh county, Pennsylvania, have invented a new and useful Improvement in Car-Wheels; and I do hereby declare that the following is a full, clear, and exact description thereof, which will enable others skilled in the art to make and use the same, reference being had to the accompanying drawings, forming part of this specification, in which—

Figure 1 represents the inner side of one of my improved car-wheels.

Figure 2 is a cross-section of the same, taken through the line $x\ x$, fig. 1.

Figure 3 represents a modification of the same.

Figure 4 is a detail section of the same, taken through the line $y\ y$, fig. 3.

Similar letters of reference indicate corresponding parts.

My invention has for its object to furnish an improved car-wheel, simple in construction, strong and durable.

And it consists in the construction and combination of various parts of the wheel, as hereinafter more fully described.

A is the rim of the wheel, which is cast solid upon the edge of the plate B, that forms the body of the wheel.

The plate B is cast dish-shaped, and upon its inner or concave side is placed a plate, C, dished or concaved in the opposite direction.

D are radial arms or brackets, which are formed upon the edge of the plate C, and which are so made as to indenture the plate B, and serve as braces to the wheel, thus compensating for the expansion and contraction in heating and cooling.

In this case the arms or braces D serve as arms to the plate C, and at the same time as brackets to the rim A and plate B.

In the modification shown in figs. 3 and 4, the brackets D are formed hollow, and solid with the rim A and plate B, and the arms E, of the plate C, alternate with them, as shown in fig. 3.

Having thus described my invention,

What I claim as new, and desire to secure by Letters Patent, is—

An improved car-wheel with a hollow centre, formed by the combination of the rim A, plate B, plate C, and arms E, and brackets D, either or both, and whether the brackets D are made hollow or solid, substantially as herein shown and described, and for the purposes set forth.

To the above specification of my invention signed by me, this 19th day of February, 1869.

W. R. THOMAS.

Witnesses:
J. W. FULLER, Jr.,
R. CLAY HAMERSLY.